(12) United States Patent
Densborn et al.

(10) Patent No.: US 10,302,142 B2
(45) Date of Patent: May 28, 2019

(54) HAND-GUIDED POWER TOOL WITH TELESCOPING SECTION

(71) Applicant: Andreas Stihl AG & Co. KG, Waiblingen (DE)

(72) Inventors: Gerd Densborn, Waiblingen (DE); Jan Föhrenbach, Fellbach (DE); Benjamin Barth, Burgstetten (DE)

(73) Assignee: Andreas Stihl AG & Co. KG, Waiblingen (DE)

( * ) Notice: Subject to any disclaimer, the term of this patent is extended or adjusted under 35 U.S.C. 154(b) by 573 days.

(21) Appl. No.: 15/040,459

(22) Filed: Feb. 10, 2016

(65) Prior Publication Data

US 2016/0238082 A1 Aug. 18, 2016

(30) Foreign Application Priority Data

Feb. 17, 2015 (EP) .................................. 15 000 469

(51) Int. Cl.

| F16D 3/06 | (2006.01) |
|---|---|
| B27B 17/00 | (2006.01) |
| A01G 3/08 | (2006.01) |
| F16B 7/14 | (2006.01) |

(52) U.S. Cl.
CPC .............. *F16D 3/06* (2013.01); *A01G 3/086* (2013.01); *B27B 17/0008* (2013.01); *F16B 7/14* (2013.01)

(58) Field of Classification Search
CPC .... A01G 3/086; B27B 17/0008; B27B 17/14; F16B 2/06; F16B 2/08; F16B 7/048; F16B 7/14; F16B 7/1445; F16B 7/1481; F16B 7/18; F16D 1/04; F16D 1/08; F16D 3/06; Y10T 403/32483; Y10T 403/32491; Y10T 403/32501; Y10T 403/457; Y10T 403/7069; Y10T 403/7077

USPC ........ 464/169; 403/109.3–109.5, 277, 374.4, 403/377

See application file for complete search history.

(56) References Cited

U.S. PATENT DOCUMENTS

| 3,284,114 A | 11/1966 | McCord |
| 3,750,251 A * | 8/1973 | Pugh ...................... B21D 11/10 29/404 |
| 5,011,104 A | 4/1991 | Fang |
| 5,013,282 A * | 5/1991 | Keller ................. B27B 17/0008 464/172 |
| 5,921,359 A * | 7/1999 | Holle ..................... F16B 7/1463 188/271 |
| 5,926,961 A | 7/1999 | Uhl |

(Continued)

*Primary Examiner* — Josh Skroupa
(74) *Attorney, Agent, or Firm* — Gudrun E. Huckett

(57) ABSTRACT

A power tool is provided with a drive motor and a tool unit with a tool driven by the drive motor. A guide tube with telescoping section with external and internal tubes is provided, wherein the internal tube is longitudinally slidable within the external tube. A clamping device secures the internal tube relative to the external tube and has a clamping member supported rotatably relative to the internal tube and connected by a thread connection to the external tube. The clamping device is provided with a clamping ring with an opening arranged about an outer circumference of the internal tube. Compression of the clamping ring in longitudinal guide tube direction effects a size reduction of the clamping ring opening. The clamping ring has a first axial face supported relative to the external tube and a second axial face supported relative to the clamping member.

20 Claims, 4 Drawing Sheets

(56) References Cited

U.S. PATENT DOCUMENTS

| | | | |
|---|---|---|---|
| 7,066,511 B2 * | 6/2006 | Newman | F16B 7/149 403/377 |
| 7,344,005 B2 * | 3/2008 | Meernik | F16B 7/14 188/300 |
| 2002/0172548 A1 | 11/2002 | Chang | |

* cited by examiner

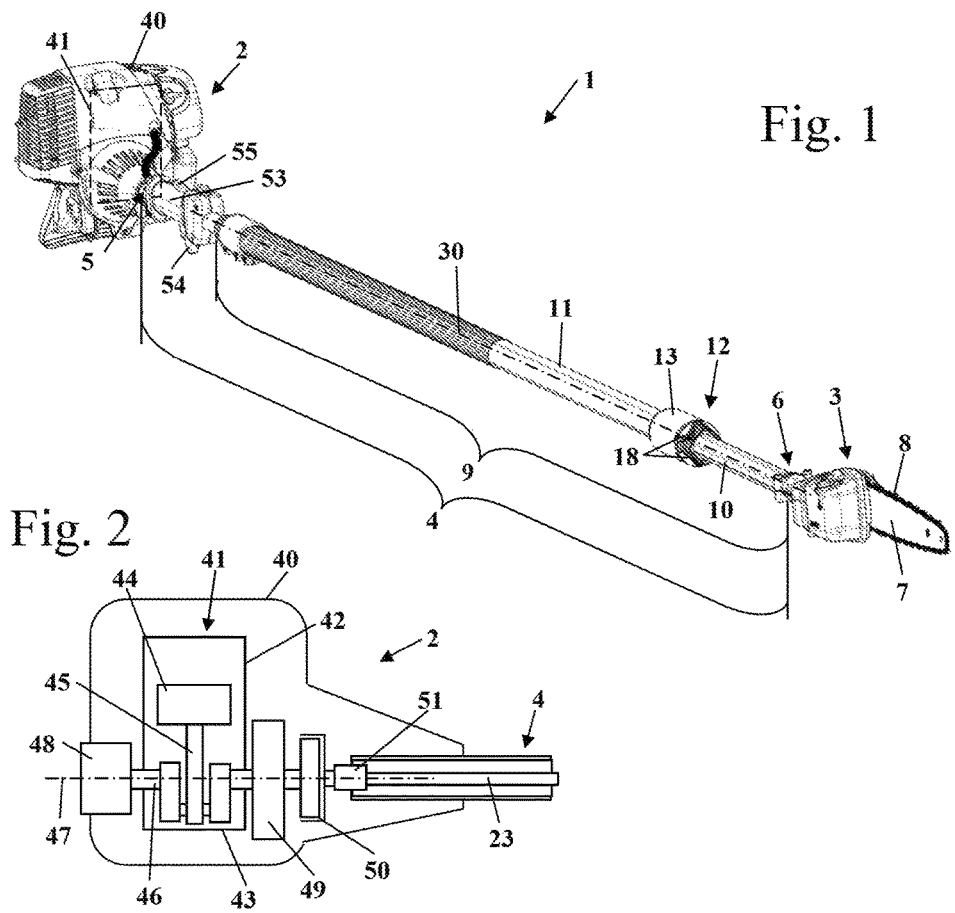
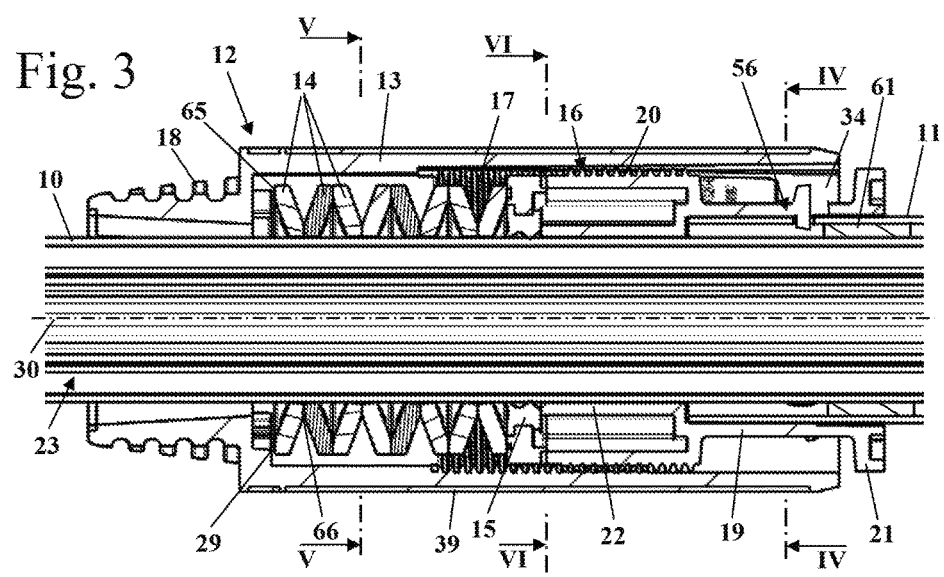

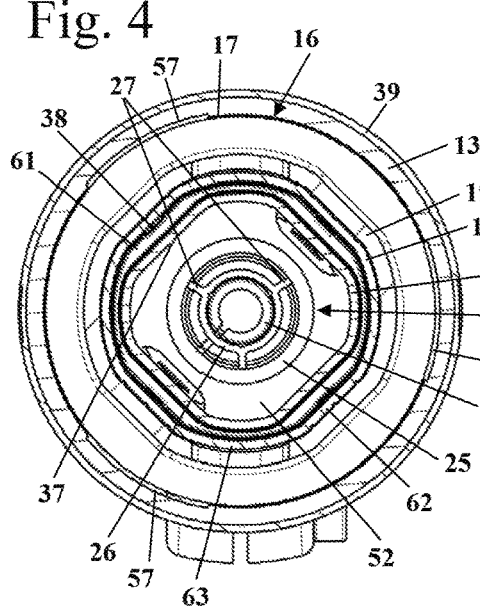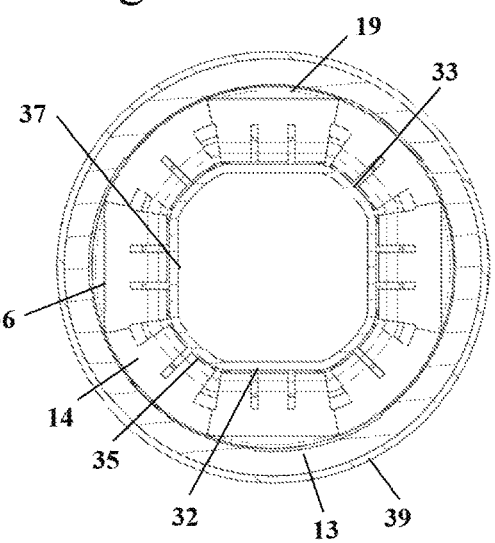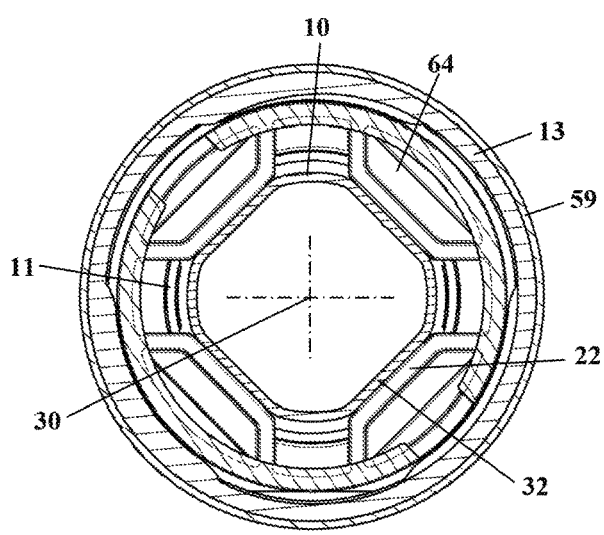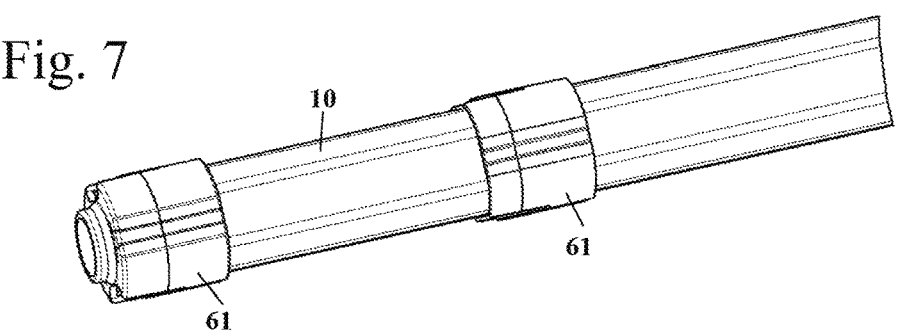

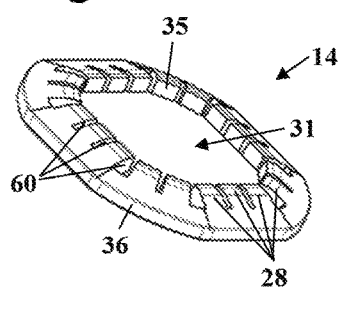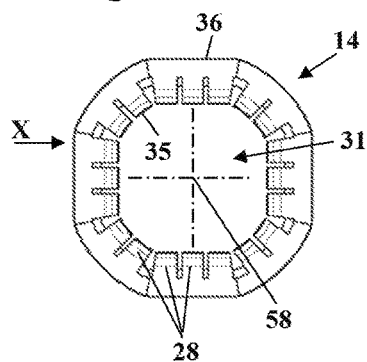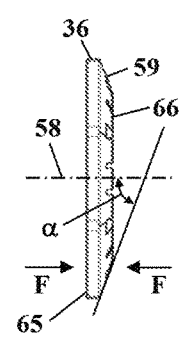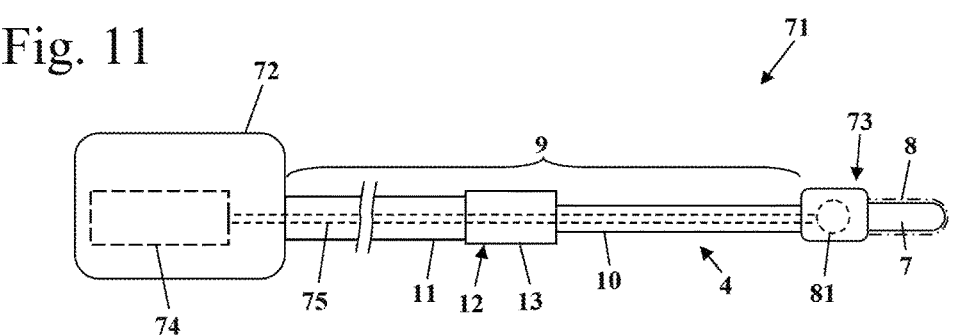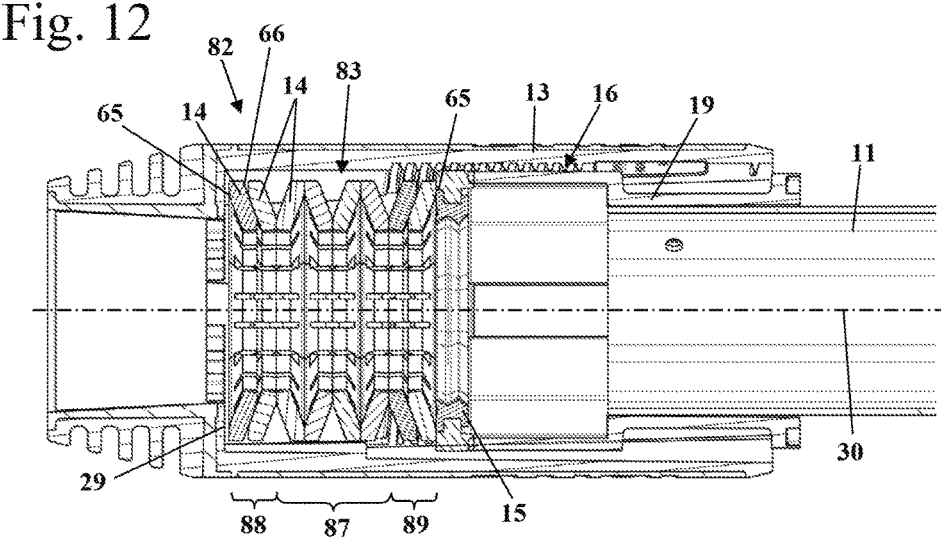

HAND-GUIDED POWER TOOL WITH TELESCOPING SECTION

BACKGROUND OF THE INVENTION

The invention relates to a hand-guided power tool with a telescoping section. The power tool comprises a drive motor and a tool unit, wherein the tool unit comprises a tool driven by the drive motor. The power tool comprises a guide tube provided with the telescoping section, wherein the telescoping section comprises an external tube and an internal tube arranged in the external tube so as to be slidable in longitudinal direction. Means for transmitting the drive energy for the tool are extending through the guide tube. A clamping device for fixation of the internal tube relative to the external tube is provided.

U.S. Pat. No. 5,926,961 discloses a pole pruner comprising a guide tube with a telescoping section. In order to secure the external tube of the telescoping section on the internal tube, a clamping member is provided that by means of screws is tangentially contracted and thereby secured.

The invention has the object to provide a hand-guided power tool with a telescoping section of the aforementioned kind that has a simple configuration and enables a simplified operation.

SUMMARY OF THE INVENTION

In accordance with the present invention, this is achieved in that the clamping device comprises a clamping member that is rotatably supported relative to the internal tube and is connected by a thread connection to the external tube, wherein the clamping device comprises at least one dished clamping ring arranged on the outer circumference of the internal tube, wherein compression of the clamping ring in the direction of a longitudinal center axis of the guide tube effects a size reduction of the opening of the clamping ring, and wherein the at least one clamping ring is supported with one axial face relative to the external tube and with the other axial face relative to the clamping member.

The clamping device that secures the internal tube relative to the external tube of the telescoping section comprises a clamping member that by means of a thread connection is connected to the external tube and that is rotatably supported relative to the internal tube. At least one dished clamping ring arranged on the outer circumference of the internal tube is provided and supported with one axial face relative to the external tube and with the other axial face relative to the clamping member. When the clamping ring is compressed in the direction of the longitudinal center axis of the guide tube, the size of the opening of the clamping ring is reduced.

A rotation of the clamping member effects due to the thread connection an axial movement of the clamping member relative to the external tube. When the clamping member is rotated such that the clamping ring is compressed in the direction of the longitudinal center axis of the guide tube, the opening of the clamping ring becomes smaller so that the clamping ring is clamped on the internal tube. In this way, the axial position of the clamping ring is fixed on the internal tube. Since the clamping ring is supported with one axial face relative to the external tube and with the other axial face relative to the clamping member that, in turn, is connected to the external tube by means of the thread connection, the axial position of the external tube relative to the internal tube is secured also. By means of the clamping member, the clamping force is adjustable by appropriate rotary travel of the clamping member in a simple way.

The thread connection can be designed to extend across several complete thread flights. The thread flight can however be interrupted. The thread connection can also be designed like a bayonet connection whose thread flight extends across more than 360°. In this context, several parallel extending partial thread flights can be provided also. The thread connection can also be provided such that for fixation and release a ¾ turn is required. The thread connection can advantageously comprise at least one locking position at an end position. Advantageously, a first locking position is provided when the clamping device is released and a second locking position can be provided when the clamping device is secured (fixed).

The clamping device can be secured and released simply by rotating the clamping member. The clamping device comprises no components such as screws or the like which, in the completely released state of the clamping device, could be lost. A tool for release and fixation of the clamping device is not required. By means of the at least one clamping ring a simple and reliable fixation of the internal tube relative to the external tube can be realized. Also, a clamping action for non-round cross-sectional shapes is possible. The desired clamping force can be adjusted by appropriate design of the clamping ring and by adjusting the number of the clamping rings. Should the clamping force decrease, for example, due to aging, a simple exchange of the at least one clamping ring is possible.

Advantageously, on the exterior tube an end member is secured that supports an outer thread of the thread connection. Since the external tube itself does not support the outer thread, a simple configuration of the external tube is possible. The thread connection is advantageously embodied as a fine thread with minimal pitch. Accordingly, a good adjustability of the clamping force results. The pitch of the thread is advantageously less than 5 mm, in particular less than 3 mm. Due to the minimal pitch, the torque that is required for rotation of the clamping member is minimal so that no tool is required for rotation of the clamping member. The thread can advantageously be formed by individual thread sections which are spaced apart from each other in circumferential direction. Accordingly, the clamping member and the end member can be pushed across each other in axial direction and the clamping device can be secured by rotation of the clamping member by significantly less than one turn.

Advantageously, the internal tube and the external tube comprise a cross-section that deviates from a circular shape. Accordingly, an anti-rotation action is provided by means of the outer contour of internal tube and external tube. Advantageously, additional guide sections for anti-rotation action are provided. The internal tube and the external tube are formed in particular as welded tubes with minimal wall thickness. The non-round cross-section can be produced during straightening of the welded tubes in a simple way, in particular when the cross-section is a flattened circular cross-section, preferably a circular cross-section that is flattened on several sides. The cross-section of the internal tube comprises advantageously flat sides that are connected by rounded corners. Advantageously, the internal tube is secured at least at one of its flat sides with anti-rotation action relative to the external tube. The clamping member is advantageously supported so as to be rotatable relative to the internal tube. Upon fixation of the clamping device, the clamping member is rotated relative to the internal tube and relative to the external tube while the internal tube and external tube are secured with anti-rotation action relative to each other.

Advantageously, the end member is resting at least partially on the outer contour of the internal tube and positions the internal tube and the external tube with anti-rotation action relative to each other. The end member serves thus advantageously for anti-rotation positioning of internal tube and external tube relative to each other as well as for producing the thread connection with the clamping member. Preferably, the at least one clamping ring is supported by means of the end member on the external tube so that by means of the end member at the same time a good force introduction into the external tube is ensured.

Advantageously, the end member is contacting only the flat sides of the internal tube and not the rounded corners. The flat sides of the internal tube can be manufactured easily with comparatively high precision. By means of the rounded corners, a tolerance compensation is possible, in particular when the internal tube is designed as a tube welded lengthwise whose flat sides are produced during straightening of the tube.

It is advantageously provided that the clamping member comprises a pressure surface on which the at least one clamping ring is axially supported. On an end which is facing away from the pressure surface, the end member comprises advantageously means for centering the clamping member. In this way, a good positional securing action of the clamping member can be achieved simply by means of the end member. In particular in case of an external tube with non-round cross-section, the clamping member can be supported only section-wise or not at all on the outer side of the external tube because the clamping member must be rotatable relative to the internal tube. Preferably, the clamping member is not contacting the outer circumference of the internal tube. By means of the end member, centering of the clamping member can be achieved in a simple way.

The clamping member is in particular designed as a sleeve which, in the clamped state of the clamping device, projects at least partially past the centering device. A compact outer appearance is provided due to the sleeve-shaped configuration of the clamping member. Getting caught on contours that project outwardly, as is known in conventional clamping devices, is thus prevented. The centering device comprise preferably a rim that at least partially closes off an annular space between the external tube and the clamping member in the clamped state of the clamping device. The rim effects in this way at the same time protection of the annular space from soiling. Advantageously the end member does not form a stop for the clamping member. The clamping member can advantageously be pushed freely across the centering device. In this way, the clamping device can be completely tensioned even when the clamping force of the at least one clamping ring has already decreased or when the use of a reduced number of clamping rings is provided.

A simple configuration results when the end member is clipped onto the external tube.

The at least one clamping ring comprises advantageously radially inwardly projecting clamping fingers with free ends which in the clamped state of the clamping device are pressed against the internal tube. The at least one clamping ring is contacting advantageously the internal tube in the untensioned (non-clamped or released) state. In this way, a minimal clamping stroke is achieved. In this context, the clamping ring is advantageously easily slidable in longitudinal direction of the internal tube in order to facilitate a simple adjustability of the desired length of the telescoping section. In order to enable axial compression of the clamping ring, it is advantageously provided that the external rim of the at least one clamping ring has a spacing in radial direction relative to the clamping member. The clamping ring can thus also expand in outward direction when axially compressed. In this context, a minimal radial gap between the clamping ring and the clamping member is sufficient.

Advantageously several clamping rings are provided. The clamping rings form advantageously a clamping ring arrangement. At least two clamping rings are advantageously serially connected with each other. The clamping ring arrangement can comprise one or several clamping ring packages that are advantageously connected serially relative to each other. A clamping ring package is comprised in this context of at least one clamping ring and can comprise in particular several clamping rings connected serially and/or connected parallel to each other. The serial connection of the clamping rings refers in this context to the arrangement of clamping rings with opposite orientation and a parallel connection concerns the arrangement of clamping rings with same orientation. The spring constant is constant within a clamping ring package.

Preferably, neighboring clamping rings are contacting each other in at least one clamping ring package adjacent to their inner rims or adjacent to their outer rims, respectively. In cross-section, a zigzag-shaped course of the adjacently positioned clamping rings results in this way. The clamping rings are arranged in a serial connection.

It has been found that the clamping rings are not uniformly loaded upon actuation of the clamping device. The load of the clamping rings arranged adjacent to the pressure surface is higher than that of the clamping rings which are positioned father away from the pressure surface. For adjustment of the load of the clamping rings, it is advantageously provided that the clamping ring arrangement comprises several clamping ring packages with different spring constants. Preferably, adjacent to at least one pressure surface a first clamping ring package with a first spring constant is arranged and adjacent to the first clamping ring package a second clamping ring package is arranged. The second clamping ring package exhibits in particular a second lower spring constant. In order to achieve different spring constants of clamping ring packages, it can be provided to design the interior diameter of the clamping rings of a clamping ring package to be smaller than the inner diameter of the clamping rings of another clamping ring package. The clamping rings advantageously comprise radially inwardly projecting clamping fingers. For adaptation of the spring constant, it can also be provided that the length of the clamping fingers of different clamping rings is different. Also, a serial connection and/or parallel connection of clamping rings or a combination of these measures may be advantageous. The at least one clamping ring is comprised advantageously of plastic material. The plastic material is in particular POM (polyoxymethylene).

Advantageously, a seal is provided that prevents penetration of dirt into the space between the internal tube and the external tube. The seal is advantageously provided between the at least one clamping ring and the end member. However, it can be advantageous also that the seal is provided between the clamping ring and a pressure surface of the clamping member. In this way, the space in which the at least one clamping ring is arranged is also sealed relative to the environment. The inner cross-section of the seal is advantageously matched to the outer cross-section of the internal tube. The internal tube and the external tube each comprise advantageously a weld seam extending in the longitudinal direction. Due to the configuration as a welded tube, the interior tube and the exterior tube can be embodied, in comparison to an extrusion-molded tube, with a circular cross-section with reduced wall thickness. In this way, a reduced weight of the power tool results.

In order to provide a good guiding action of the external tube on the internal tube, it is advantageously provided that on the end of the internal tube which is projecting into the external tube a guide part is arranged that guides the internal tube in the external tube. Advantageously, additional guide parts between internal tube and external tube are provided at a spacing to the end of the internal tube.

The drive motor is advantageously part of a drive unit which is arranged at a first end of the guide tube. The tool unit is advantageously arranged on a second end of the guide tube wherein the drive shaft is extending through the guide tube and is formed as a telescoping shaft. The drive shaft serves as a transmitting device that transmits the drive energy, namely as rotation of the drive shaft about its longitudinal axis. The drive shaft is advantageously supported by means of a bearing part in the internal tube. Advantageously, several bearing parts positioned at an axial spacing relative to each other are provided. The drive motor can however also be arranged on the tool unit. The drive motor is then advantageously embodied as an electric motor and connected by means of a cable, in particular a spiral cable, with an energy supply which is provided at the other end of the guide tube and is in particular embodied as a battery pack. In this context, the cable as a transmission device transmitting the drive energy to the tool is extending advantageously through the guide tube.

BRIEF DESCRIPTION OF THE DRAWING

FIG. 1 is a perspective illustration of a pole pruner.
FIG. 2 is a schematic illustration of the drive unit of the pole pruner of FIG. 1.
FIG. 3 is a section view of a clamping device of the pole pruner of FIG. 1.
FIG. 4 is a section view along the section line IV-IV of FIG. 3.
FIG. 5 is a section view along the section line V-V of FIG. 3.
FIG. 6 is a section view along the section line VI-VI of FIG. 3.
FIG. 7 is a perspective illustration of an end section of the internal tube.
FIG. 8 is a perspective illustration of a clamping ring.
FIG. 9 is a plan view of the clamping ring of FIG. 8.
FIG. 10 is a side view in the direction of arrow X in FIG. 9.
FIG. 11 is a schematic illustration of an embodiment of a pole pruner.
FIG. 12 is a section illustration of an embodiment of a clamping device.

DESCRIPTION OF THE PREFERRED EMBODIMENTS

Figure 13:
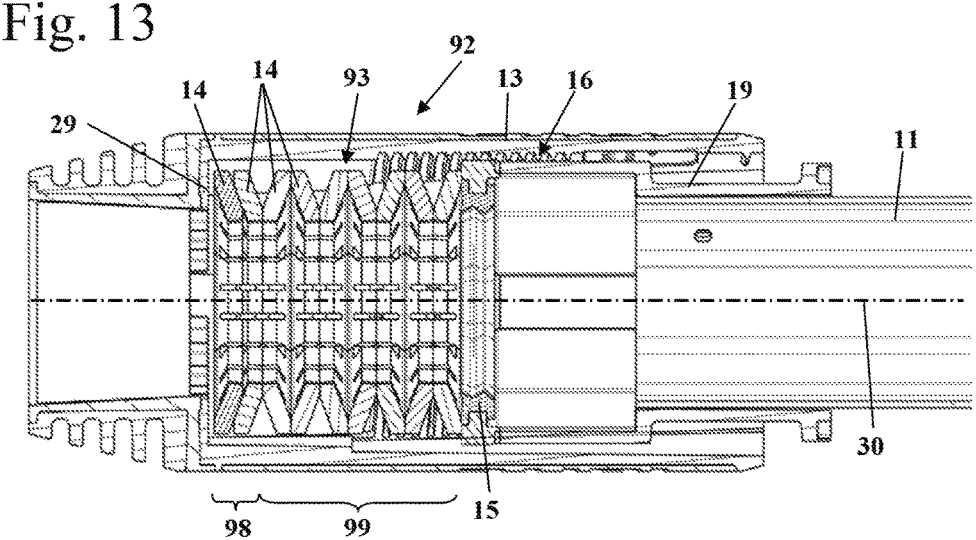
FIG. 13 is a section illustration of another embodiment of the clamping device.

FIG. 1 shows a pole pruner 1 comprising a telescoping section as an embodiment of a hand-guided power tool. Instead of a pole pruner, any other hand-guided power tool such as a hedge trimmer or the like can be provided also. The pole pruner 1 comprises a drive unit 2 with housing 40 in which a drive motor 41, schematically shown in FIG. 1, is arranged.

The pole pruner 1 comprises also a tool unit 3 that is connected by a guide tube 4 with the drive unit 2. The drive unit 2 is arranged on a first end 5 of the guide tube 4 and the tool unit 3 is secured on a second end 6 of the guide tube 4. The tool unit 3 comprises a guide bar 7 about which a saw chain 8 is driven in circulation.

The guide tube 4 comprises a telescoping section 9 which is extending across most of the length of the guide tube 4. The guide tube 4 comprises a longitudinal center axis 30. Adjacent to the first end 5 of the guide tube 4, a handle 53 is arranged on the guide tube 4. Operating elements, i.e., a throttle trigger 54 for operating the drive motor 41 as well as a throttle trigger lock 55, are arranged on the handle 53.

The telescoping section 9 comprises an internal tube 10 on which the tool unit 3 is secured. The telescoping section 9 comprises also an external tube 11 that is fixedly connected to the drive unit 2. The internal tube 10 is secured (fixed) relative to the external tube 11 by means of a releasable clamping device 12. The clamping device 12 comprises a clamping member 13 which is rotatably supported relative to the internal tube 10 and the external tube 11. The configuration of the clamping device 12 will be explained in more detail in the following.

FIG. 2 shows schematically the configuration of the drive unit 2. In the housing 40, the drive motor 41 is arranged which is embodied as a single cylinder combustion engine. The drive motor 41 is in particular a two-stroke engine or a mixture-lubricated four-stroke engine. The drive motor 41 comprises a cylinder 42 in which a piston 44 is supported for reciprocating movement. The piston 44 drives by means of a connecting rod 45 a crankshaft 46 in rotation which is rotatably supported about axis of rotation 47 in the crankcase 43. The drive unit 2 comprises a starter device 48 for starting the drive motor 41. The starter device 48 is advantageously a cable starter which is to be actuated by hand. The starter device 48 can also be an electrically actuated starter device. On the side of the starter device 48 which is facing away from the drive motor 41, a fan wheel 49 is secured on the crankshaft 46. Between the fan wheel 49 and the guide tube 4, a centrifugal clutch 50 is arranged whose output part is connected by a coupling part 51 with a drive shaft 23. The drive shaft 23 extends through the guide tube 4 and is also designed to be telescoping; this will be explained in the following in more detail.

FIG. 3 shows the configuration of the clamping device 12 in detail. At the end of the external tube 11 an end member 19 is secured. The other end of the external tube 11 is secured on the drive unit 2 in the embodiment. The end member 19 is connected with the external tube 11 by means of a schematically indicated locking connection 56 so as to be fixed rotationally and fixed axially, i.e., in the direction of the longitudinal center axis 30. The end member 19 forms a support surface for a seal 15 which is resting on the outer circumference of the internal tube 10 and which seals the interior between internal tube 10 and external tube 11. The inner cross-section of the seal is matched in this context to the outer cross-section of the internal tube 10.

The end member 19 comprises an outer thread 20 of a thread connection 16. By means of the thread connection 16, the clamping member 13 and the end member 19 are connected to each other. As is shown in FIG. 3, the thread connection 16 is designed as a fine thread with minimal pitch. The pitch is advantageously less than 5 mm, in particular less than 3 mm. A greater pitch, in particular a pitch of approximately 5 mm up to approximately 10 mm, can however be advantageous. In this way, a simple and fast fixation and release of the clamping device 12 with minimal rotary angle of the clamping member 13 can be achieved. The clamping member 13 comprises an inner thread 17 of the thread connection 16. The clamping member 13 is movable by means of the thread connection 16 relative to the external tube 11. The clamping member 13 has no contact with the internal tube 10. The clamping member 13 is arranged relative to the internal tube 10 so as to be rotatable and axially slidable. In the operative connection between the external tube 11 and the internal tube 10, a plurality of clamping rings 14 are active which are arranged on the outer circumference of the internal tube 10. When the clamping rings 14 are compressed in axial direction, i.e., in the direction of the longitudinal center axis 30 of the guide tube 4, the opening of the clamping rings 14 becomes smaller so that the clamping rings 14 are clamped on the outer circumference of the internal tube 10. The clamping rings 14 are arranged in axial direction between a pressure surface 29 of the clamping member 13 and the end member 19.

As shown in FIG. 3, the support rings 14 each are supported with an axial face 65, 66 relative to the clamping member 13 and with the other axial face 66, 65 relative to the end member 19. The clamping rings 14 are connected one after another in the manner of a serial connection of springs. The force which is exerted on the clamping rings 14 acts between the external tube 11 and the clamping member 13 in the direction of the longitudinal center axis 30. When the clamping member 13 is rotated such that the pressure surface 29 is moved in the direction toward the end member 19, the clamping rings 14 are compressed in the direction of the longitudinal center axis 30 so that their inner diameter is reduced. In this way, the clamping rings 14 secure the internal tube 10. The clamping rings 14 are clamped on the internal tube 10 in this context. The clamping rings 14 are at the same time secured between the contact surface 29 and the end member 19 and, in this way, secured relative to the external tube 11 in axial direction. By compression of the clamping rings 14, a fixation of the internal tube 10 relative to the external tube 11 is achieved in a simple way. The clamping member 13 is sleeve-shaped. The pressure surface 29 is designed as an inwardly projecting rim on the end of the clamping member 13 which is facing the tool unit 3.

In the embodiment, eight clamping rings 14 are provided. However, a different number of clamping rings 14 can be provided also.

So that an operator can easily rotate the clamping member 13, the clamping member 13 comprises grip depressions 18, shown in FIG. 1, on its end which is facing away from the external tube 11 and is facing the tool unit 3. In order to facilitate gripping of the clamping member 13, the clamping member 13 furthermore is provided on its outer circumference with a jacket 39 which is advantageously comprised of a soft plastic material. The jacket 39 is advantageously injection-molded onto the clamping member 13. As shown in FIG. 1, the clamping member 13 comprises a cylindrical outer circumference. However, any other outer contour can be advantageous also, in particular, in order to facilitate gripping of the clamping member 13. The outer diameter of the clamping member 13 is comparatively large. Accordingly, the clamping member 13 can be easily gripped by the operator and, even without a tool, a comparatively great torque can be applied on the clamping member 13.

As is shown in FIG. 3, an annular space 34 is formed between the end member 19 and the clamping member 13 on the side of the thread connection 16 which is facing away from the clamping rings 14. The end member 19 comprises a radially outwardly oriented rim 21 which at least partially covers the annular space 34 in axial direction. The rim 21 serves also as a centering device configured to center the clamping member 13 when the clamping member 13 in FIG. 3 has been rotated/turned so far to the right that the clamping member 13 engages across the rim 21. The end member 19 comprises also a guide section 22 with which the end member 19 is resting on the outer circumference of the interior tube 10. In the embodiment, the guide section 22 forms a contact surface for the seal 15. FIG. 3 shows also the drive shaft 23.

FIG. 4 shows the arrangement of the drive shaft 23 in the guide tube 4. The drive shaft 23 penetrates the internal tube 10 and the external tube 11. The drive shaft 23 comprises an inner shaft 24 which is supported by means of a bearing element 26 in an outer shaft 25. The inner shaft 24 and the outer shaft 25 are connected fixedly to each other for common rotation. The inner shaft 24 is inserted in a telescoping fashion in the outer shaft 25. The bearing element 26 comprises outwardly projecting longitudinal ribs 27 with which the bearing element 26 is supported on the inner circumference of the outer shaft 25.

FIG. 4 shows also the configuration of the internal tube 10 and of the external tube 11 in detail. The internal tube 10 comprises a non-round flattened cross-section which is also shown in FIG. 5. In the embodiment, the internal tube 10 comprises four flattened and flat sides 32 that are connected to each other by rounded corners 33. On one of the flat sides 32, a weld seam 37 is provided which extends across the entire length of the internal tube 10. On the inner side of the internal tube 10, the weld seam 37 forms a raised portion in the embodiment. The internal tube 10 is produced as a welded tube from a flat pre-cut blank. After the internal tube 10 has been welded, the internal tube 10 is straightened. In this context, the flat sides 32 are pressed in by straightening rollers until the desired dimension of the internal tube 10, i.e., the desired spacing between the oppositely positioned flat sides 32, is reached. The end member 19 in the embodiment is contacting with its guide section 22 (FIG. 3) only the flat sides 32 of the internal tube 10 and not on the rounded corners 33.

As shown in FIG. 4, the external tube 11 has also a non-round flattened circular cross-section. The external tube 11 also has a weld seam 38 extending in the longitudinal direction. The external tube 11 is also produced as a welded tube and, after welding, is straightened while being deformed. During straightening four flat sides 62 are produced in the embodiment that are connected to each other by rounded corners 63.

As shown in FIG. 4, the bearing part 52 bridges a spacing between the outer shaft 25 and the inner side of the internal tube 10 and effects in this way centering of the outer shaft 25 in the internal tube 10. Advantageously, several bearing parts 52 are provided.

As also shown in FIG. 4, the internal tube 10 and the external tube 11 are pushed into each other with minimal radial play. Already due to the non-round cross-sectional shape of internal tube 10 and external tube 11 an anti-rotation action is provided in this way. Preferably, additional elements are provided that effect an anti-rotation action between internal tube and external tube. In a preferred embodiment, on the end of the internal tube 10 that is projecting into the external tube, a guide part 61 is arranged that guides the internal tube 10 within the external tube 11.

FIG. 7 shows a guide part 61 at the end of the internal tube 10 as well as a further guide part 61 that is arranged at a spacing to the end of the internal tube 10. On the outer circumference of the guide part 61, the external tube 11 is resting when internal tube 10 and external tube 11 are pushed into each other far enough, as shown schematically in FIG. 3.

As shown in FIG. 5, the clamping rings 14 comprise an inner rim 35 which is contacting the outer circumference of the internal tube 10. The inner rim 35 is contacting the flat sides 32 as well as the rounded corners 33. As also shown in FIG. 5, the clamping rings 14 comprise an outer rim 36 positioned at a radial spacing relative to the inner side of the clamping member 13. In this context, at the rounded corners of the clamping ring 14 only a small gap between clamping ring 14 and clamping member 13 is formed. As also shown in FIGS. 4 and 5, the inner thread 17 of the clamping member 13 is formed with three interruptions 57. In this way, a simple removal from the mold is possible when producing the clamping member 13 in an injection molding process.

FIG. 6 shows the contact of the end member 19 on the internal tube 10. The guide section 22 of the end member 19 is formed by individual fingers 64 which extend parallel to the longitudinal center axis 30 and which are resting on the flat sides 32 of the internal tube 10. The end member 19 is advantageously not contacting the rounded corners 33 of the internal tube 10. Since the flat sides 32 are produced with high precision, a good and precise guiding action is provided. The rounded corners 33 can be used during manufacture for tolerance compensation.

FIGS. 8 to 10 show the configuration of a clamping ring 14 in detail. As shown in FIG. 8, the clamping ring 14 comprises a plurality of inwardly projecting clamping fingers 28. The end faces of the clamping fingers 28 form the inner rim 35 of the clamping ring 14. The individual clamping fingers 28 are separated from each other by approximately radially extending slots 60. The inner rim 35 delimits an opening 31 of the clamping ring 14 through which the internal tube 10 is projecting. As shown in FIGS. 5 and 9, in the embodiment three clamping fingers 28 each are provided for contacting each flat side 32 and two clamping fingers 28 each are provided for contacting each rounded corner 33. The outer rim 36 is designed as a continuous rim that is also provided with flat sides that are connected to each other by rounded corners. Accordingly, all clamping fingers 28 have approximately identical length and elasticity. The clamping ring 14 comprises a center axis 58 which in the installed state coincides with the longitudinal center axis 30 of the guide tube 4.

As shown in FIGS. 8 and 10, the clamping ring 14 comprises an approximately truncated cone shaped configuration. The clamping ring 14 comprises an end face 59 that is positioned at an angle α relative to the center axis 58, wherein the angle α can be, for example, from approximately 40° to approximately 85°. In the embodiment, an angle α is provided that is between 60° and 80°. The clamping ring 14 comprises a first axial face 65 which adjoins the outer rim 36 as well as a second axial face 66 which adjoins the inner rim 35. When the clamping ring 14 is compressed in axial direction by a clamping force F, the clamping fingers 28 are pivoted inwardly and reduce the size of the opening 31. When the clamping device 12 is not clamped, the inner rim 35 of the clamping ring 14 is resting on the internal tube 10 as shown in FIG. 3. For a minimal clamping travel, the clamping fingers 28 thus already clamp the internal tube 10 and secure or fix the internal tube 10 in the direction of the longitudinal center axis 30.

FIG. 11 shows an embodiment of a pole pruner 71. Instead of the drive unit 2, the pole pruner 71 comprises a housing 72 in which a battery pack 74 is arranged. Instead of the battery pack 74, also a power cable for connecting to an energy source can be provided on the housing 72. On the end of the guide tube 4 that is facing away from the housing 72 a tool unit 73 is arranged that comprises a guide bar 7 and a saw chain 8 which is driven in circulation about the guide bar 7. In all embodiments, same reference characters identify elements that correspond to each other. The pole pruner 71 comprises a cable 75 connecting the battery pack 74 in the housing 72 with a drive motor 81 of the tool unit 73. The cable 75 is advantageously a spiral cable and comprises, in addition to leads for energy supply, also leads for signal transmission. The drive motor 81 is designed as an electric motor and can be supplied by cable 75 with energy. The cable 75 is passed through the guide tube 4 and extends completely through the telescoping section 9 which, in the embodiment according to FIG. 11, extends from the housing 72 to the tool unit 73.

It has been found that the load on the clamping rings 14 upon actuation of the clamping device 12 is non-uniform. The clamping rings 14 which are arranged near the pressure surface 29 are exposed to a high load while the clamping rings 14 of the central area between pressure surface 29 and seal 15 are less strongly loaded. Upon actuation of the clamping device 12, at the pressure surface 29 a pressure force in the direction of the longitudinal center axis 30 is introduced into the clamping ring 14 which is arranged adjacent to the pressure surface 29. This pressure force is transmitted to the respective adjoining clamping ring 14 as long as the clamping rings 14 can axially move and can be compressed. When the introduced pressure force already causes too strong a deformation of a clamping ring 14, the clamping ring 14 clamps on the internal tube 10 and a further axial movement of this clamping ring 14 is prevented. Accordingly, the pressure force can no longer be transmitted farther to the neighboring clamping ring 14. A further tightening of the clamping device 12 can effect an excessive deformation and loading of the already axially fixed clamping rings 14. In order to enable that the clamping rings 14 upon actuation of the clamping device 12 can move in axial direction until all clamping rings 14 are clamped with their openings 31 on the internal tube 10, the spring constant of the clamping rings 14 or of the clamping ring packages can be adjusted.

FIG. 12 shows an embodiment of a clamping device 82 whose clamping rings 14 form a clamping ring arrangement 83. The clamping device 82 differs from the clamping device 12 essentially by the arrangement of the clamping rings 14. The clamping ring arrangement 83 comprises a first clamping ring package 88 that is contacting the pressure surface 29, a second clamping ring package 87 as well as a third clamping ring package 89. The third clamping ring package 89 is arranged on the side of the second clamping ring package 87 that is facing away from the first clamping ring package 88 and is contacting the seal 15. The second clamping ring package 87 is arranged between the first clamping ring package 88 and the third clamping ring package 89. The clamping ring arrangement 83 is symmetric so that the clamping ring arrangement 83 can be arranged with the first clamping ring package 88 or with the third clamping ring package 89 on the pressure surface 29.

The first clamping ring package 88 comprises several clamping rings 14, in the embodiment two parallel connected clamping rings 14. In the second clamping ring package 87 several clamping rings 14 are connected in series with each other. In the third clamping ring package 89, several clamping rings 14 are parallel connected, in the embodiment two clamping rings 14.

A serial connection of clamping rings 14 characterizes opposite orientation of the sequential clamping rings 14 in the arrangement and parallel connection characterizes same orientation of sequentially arranged clamping rings 14 in the arrangement. In the serial connection, neighboring clamping rings 14 are contacting each other with their concave faces, i.e., their first axial faces 65 (FIG. 10), or their convex faces, i.e., their second axial faces 66. In the parallel connection, the concave face of the clamping ring 14 is contacting the convex face of the neighboring clamping ring 14.

In the embodiment according to FIG. 12, neighboring clamping rings 14 are resting on each other in axial direction. The spring constant in the second clamping ring package 87, as a result of the serial connection of the clamping rings 14, is smaller than the spring constant of the first clamping ring package 88. In the embodiment, the spring constant of the second clamping ring package 87 is also smaller than the spring constant of the third clamping ring package 89. The spring constant decreases, beginning at the pressure surface 29, from the first clamping ring package 88 to the second clamping ring package 87 and from the second clamping ring package 87 to the third clamping ring package 89. The spring constants of the first clamping ring package 88 and of the third clamping ring package 89 are of the same magnitude. In this way, upon compression of the first and the third clamping ring packages 88, 89 a higher force is required then for compression of the second clamping ring package 87. In this way, the clamping rings 14 in the second clamping ring package 87 are compressed by a greater travel stroke and clamp on the internal tube 10 (FIG. 3) before the clamping rings 14 in the first clamping ring package 88 and in the third clamping ring package 89 will clamp the internal tube 10.

FIG. 13 shows a further embodiment of a clamping device 92 with a clamping ring arrangement 93. The clamping ring arrangement 93 comprises a clamping ring package 98 in which two clamping rings 14 are connected parallel to each other and a clamping ring package 99 in which several clamping rings 14 are connected in series. The clamping ring package 98 comprises a higher spring constant than the clamping ring package 99 and is arranged adjacent to the pressure surface 29. In this way, the spring constant of the clamping ring arrangement 93 decreases from the pressure surface 29 in the direction toward the end member 19. The clamping ring package 98 is therefore less strongly compressed than the clamping ring package 99.

Figure 14:
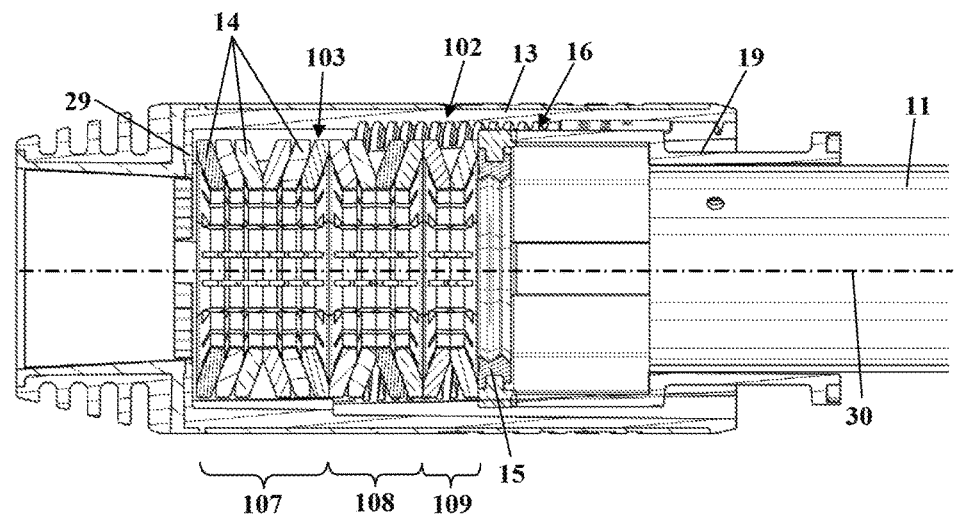
FIG. 14 is a section illustration of yet another embodiment of the clamping device.

FIG. 14 shows an embodiment of a clamping device 102 with a clamping ring arrangement 103 that comprises clamping ring packages 107, 108, and 109. The spring constant of the clamping ring packages 107, 108, 109 decreases from the pressure surface 29 in the direction toward the end member 19. Within each clamping ring package 107, 108, 109 the spring constant is constant. This clamping ring package 107 adjoins the pressure surface 29. The clamping ring package 107 comprises two groups of three parallel connected clamping rings 14 wherein the two groups of clamping rings 14 are serially connected to each other. The adjoining clamping ring package 108 comprises a smaller spring constant than the clamping ring package 107. The clamping ring package 108 comprises two groups of two parallel connected clamping rings 14, respectively, wherein the two groups of clamping rings 14 are connected in series to each other. In the direction toward the end member 19, the clamping ring package 109 adjoins the clamping ring package 108. The clamping ring package 109 comprises two clamping rings 14 that are connected in series. The spring constant of the clamping ring package 109 is smaller than the spring constant of the clamping ring package 108. In this way, it is achieved that upon fixation of the clamping device 102 first the clamping rings 14 of the clamping ring package 109 closest to the end member 19 clamp on the internal tube 10. Upon further axial displacement of the clamping member 13 in the direction of the end member 19, the clamping rings 14 of the clamping ring package 108 are fixed on the internal tube 10 and only subsequently the clamping rings 14 of the clamping ring package 107 are fixed on the internal tube 10.

With suitable alignment and arrangement of identical clamping rings the spring constant can be suitably adjusted in various areas of a clamping ring arrangement. It can also be expedient to design clamping rings of a clamping ring arrangement with different inner diameters and/or different lengths of the clamping fingers in order to achieve a contact on the internal tube with different degrees of deformation of the clamping rings. A combination of different dimensions and suitable arrangement of the clamping rings can be advantageous also in order to achieve a desired clamping behavior on the internal tube.

Advantageously, the spring constant of a clamping ring package or the deformation of a clamping ring package that is required in order to secure the clamping rings of the clamping ring package on the internal tube is the greater the farther the clamping ring package is positioned away from the stop, in particular the end member 19. In this way, a more uniform loading of the clamping rings is enabled.

In the embodiments, the outermost and innermost clamping rings 14 contact the pressure surface 29 or the stop with their concave first axial face 65, respectively. The force introduction into the outermost clamping ring 14 or transmission away from the innermost clamping ring 14 is realized at their large diameter. It can however also be advantageous to arrange the clamping rings 14 with their convex second axial face 66 so as to face the pressure surface 29 or the stop so that contact is thus realized at the small diameter. In the embodiments, the contact is formed by the seal 15.

Same reference characters indicate in all Figures elements that correspond to each other. Elements in the FIGS. 12 to 14 that are not described in detail are advantageously embodied like the elements disclosed and described in regard to the clamping device 12.

The specification incorporates by reference the entire disclosure of European priority document 15 000 469.5 having a filing date of Feb. 17, 2015.

While specific embodiments of the invention have been shown and described in detail to illustrate the inventive principles, it will be understood that the invention may be embodied otherwise without departing from such principles.

What is claimed is:
1. A hand-guided power tool comprising:
a drive motor;
a tool unit comprising a tool driven by the drive motor;
a guide tube comprising a telescoping section, wherein the telescoping section comprises an external tube and an internal tube, wherein the internal tube is arranged and guided so as to be longitudinally slidable within the external tube;
a transmission device transmitting drive energy to the tool and extending through the guide tube;
a clamping device configured to fix the internal tube relative to the external tube;
wherein the clamping device comprises a clamping member and the clamping member is supported rotatably relative to the internal tube and is connected by a thread connection to the external tube;

wherein the clamping device further comprises at least one dished clamping ring comprising an opening, wherein the opening is arranged about an outer circumference of the internal tube;

wherein a compression of the at least one dished clamping ring in a direction of a longitudinal center axis of the guide tube effects a size reduction of the opening of the at least one dished clamping ring;

wherein the at least one dished clamping ring comprises an outer circumference and is arranged such that the outer circumference has no contact with neighboring components;

wherein the at least one dished clamping ring comprises a first axial face and a second axial face opposite the first axial face, wherein the at least one dished clamping ring is supported with the first axial face at the external tube and with the second axial face at the clamping member, wherein the at least one dished clamping ring is compressed in the direction of the longitudinal center axis of the guide tube when the clamping member is rotated relative to the external tube in a direction effecting fixation of the clamping device.

2. The power tool according to claim 1, wherein the external tube comprises an end member comprising an outer thread of the thread connection.

3. The power tool according to claim 2, wherein the internal tube and the external tube each have a cross-section deviating from a circular shape.

4. The power tool according to claim 3, wherein the cross-section of the internal tube comprises flat sides and rounded corners, wherein the flat sides are connected to each other by the rounded corners.

5. The power tool according to claim 4, wherein the internal tube is secured at least by one of the flat sides with an anti-rotation action relative to the external tube.

6. The power tool according to claim 4, wherein the end member is contacting at least partially an outer contour of the internal tube and wherein the end member secures the internal tube and the external tube relative to each other with an anti-rotation action.

7. The power tool according to claim 6, wherein the end member is contacting only the flat sides of the internal tube and not the rounded corners.

8. The power tool according to claim 2, wherein the clamping member comprises a pressure surface and the at least one dished clamping ring is axially supported on the pressure surface, wherein the end member comprises on an end facing away from the pressure surface a centering device configured to center the clamping member.

9. The power tool according to claim 1, wherein the at least one dished clamping ring comprises radially inwardly projecting clamping fingers each comprising free ends, wherein, in a clamped state of the at least one dished clamping ring, the free ends are pressed against the internal tube.

10. The power tool according to claim 1, wherein the at least one dished clamping ring in a non-clamped state is contacting the internal tube and wherein an outer rim of the at least one dished clamping ring is positioned at a radial spacing relative to the clamping member.

11. The power tool according to claim 1, wherein a plurality of the at least one dished clamping ring are provided.

12. The power tool according to claim 11, wherein the plurality of the dished clamping rings form a clamping ring arrangement in which at least two of the dished clamping rings are arranged in serial connection relative to each other.

13. The power tool according to claim 11, wherein the plurality of the dished clamping rings form a clamping ring arrangement comprising at least two serially connected clamping ring packages comprised of the dished clamping rings, wherein the clamping ring packages each have a different spring constant.

14. The power tool according to claim 13, wherein the clamping ring packages include a first clamping ring package and a second clamping ring package, wherein the first clamping ring package comprises a first spring constant and wherein the second clamping ring package comprises a second spring constant, wherein the first clamping ring package is arranged adjacent to at least one pressure surface of the clamping device and wherein the second clamping ring package adjoins the first clamping ring package opposite the at least one pressure surface, wherein the second spring constant is lower than the first spring constant.

15. The power tool according to claim 1, wherein the at least one dished clamping ring is made of plastic material.

16. The power tool according to claim 1, wherein the drive motor is part of a drive unit arranged at a first end of the guide tube, wherein the tool unit is arranged at a second end of the guide tube opposite the first end, and wherein the transmission device is a drive shaft embodied as a telescoping shaft.

17. The power tool according to claim 16, wherein the drive shaft is supported by means of at least one bearing part in the internal tube.

18. The power tool according to claim 1, wherein an outer diameter of the at least one dished clamping ring remains constant when the at least one dished clamping ring is compressed.

19. A hand-guided power tool comprising:
a drive motor;
a tool unit comprising a tool driven by the drive motor;
a guide tube comprising a telescoping section, wherein the telescoping section comprises an external tube and an internal tube, wherein the internal tube is arranged and guided so as to be longitudinally slidable within the external tube;
a transmission device transmitting drive energy to the tool and extending through the guide tube;
a clamping device configured to fix the internal tube relative to the external tube;
wherein the clamping device comprises a clamping member and the clamping member is supported rotatably relative to the internal tube and is connected by a thread connection to the external tube;
wherein the clamping device further comprises at least one dished clamping ring comprising an opening, wherein the opening is arranged about an outer circumference of the internal tube;
wherein a compression of the at least one dished clamping ring in a direction of a longitudinal center axis of the guide tube effects a size reduction of the opening of the at least one dished clamping ring;
wherein the at least one dished clamping ring comprises a first axial face and a second axial face opposite the first axial face, wherein the at least one dished clamping ring comprises an outer circumference and is arranged such that the outer circumference has no contact with neighboring components, wherein the at least one dished clamping ring is arranged such the first axial face and the second axial face contact the neighboring components;

wherein the at least one dished clamping ring is supported with the first axial face directly or indirectly at the external tube and with the second axial face directly or indirectly at the clamping member.

20. A hand-guided power tool comprising:
a drive motor;
a tool unit comprising a tool driven by the drive motor;
a guide tube comprising a telescoping section, wherein the telescoping section comprises an external tube and an internal tube, wherein the internal tube is arranged and guided so as to be longitudinally slidable within the external tube;
a transmission device transmitting drive energy to the tool and extending through the guide tube;
a clamping device configured to fix the internal tube relative to the external tube;
wherein the clamping device comprises a clamping member and the clamping member is supported rotatably relative to the internal tube and is connected by a thread connection to the external tube;
wherein the clamping device further comprises at least one clamping ring comprising an opening, wherein the at least one clamping ring is disc-shaped and curved, wherein the opening is arranged about an outer circumference of the internal tube;
wherein a compression of the at least one clamping ring in a direction of a longitudinal center axis of the guide tube effects a size reduction of the opening of the at least one clamping ring;
wherein the at least one clamping ring comprises a first axial face and a second axial face opposite the first axial face, wherein the at least one clamping ring is supported with the first axial face directly or indirectly at the external tube and with the second axial face directly or indirectly at the clamping member.

* * * * *